2 Sheets—Sheet 1.
C. TYSON.
Mechanical-Movement.
No. 215,778. Patented May 27, 1879.
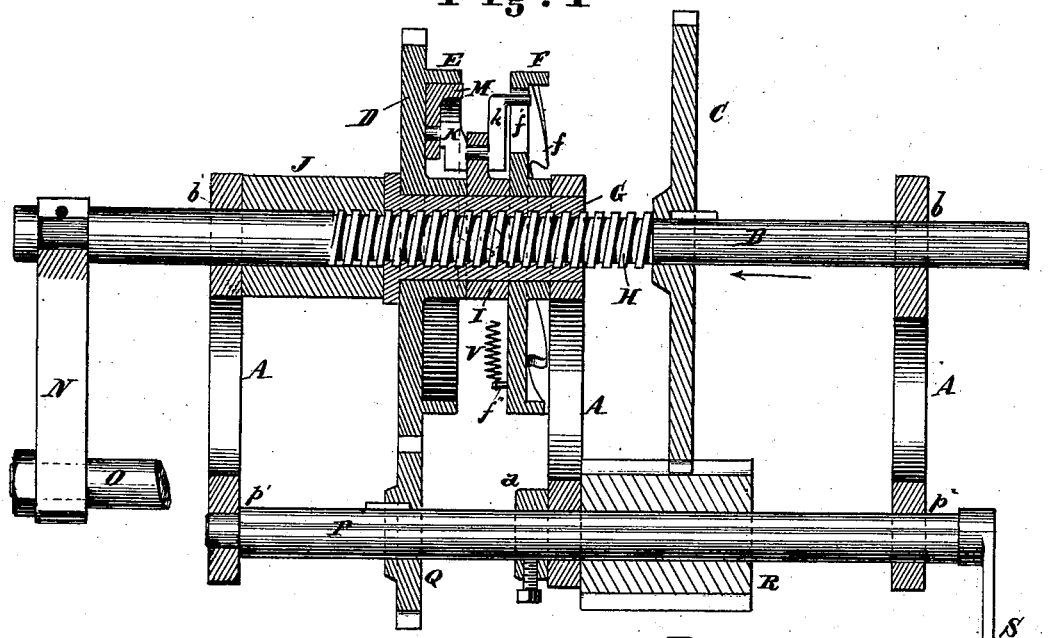
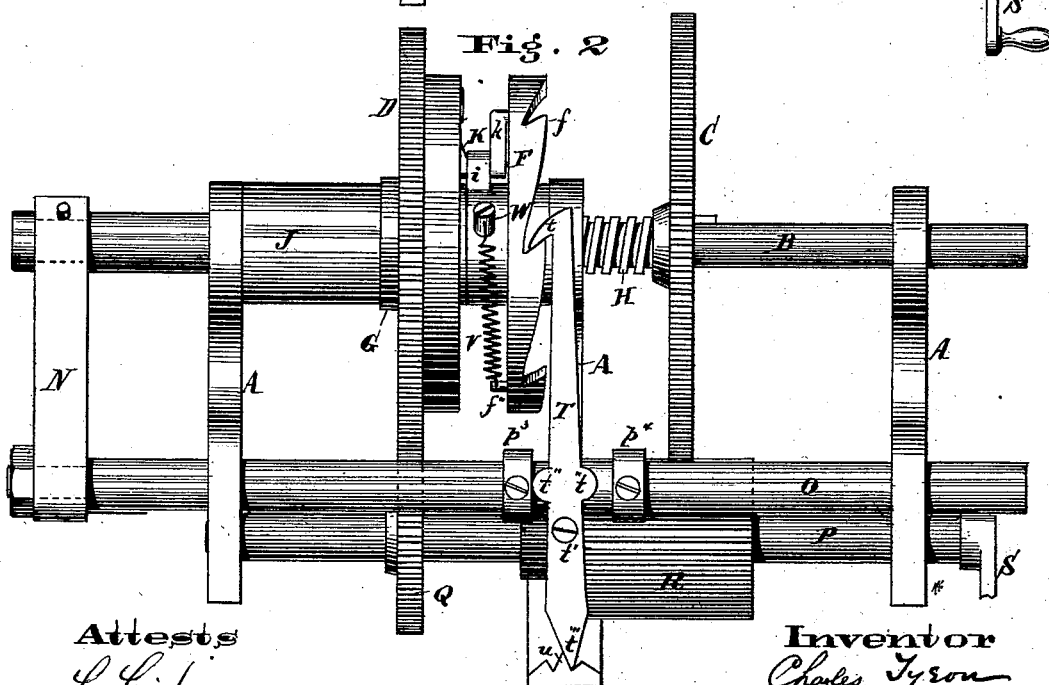
Attests
S. Fisher.
John H. Armstrong
Inventor
Charles Tyson
by his attorney 2 Sheets—Sheet 2.

C. TYSON.
Mechanical-Movement.

No. 215,778.  Patented May 27, 1879.

Attests
S. Fisher.
J. H. Armstrong

Inventor
Charles Tyson
by his attorney

UNITED STATES PATENT OFFICE.

CHARLES TYSON, OF PHILADELPHIA, PENNSYLVANIA.

IMPROVEMENT IN MECHANICAL MOVEMENTS.

Specification forming part of Letters Patent No. 215,778, dated May 27, 1879; application filed February 14, 1879.

*To all whom it may concern:*

Be it known that I, CHARLES TYSON, of Philadelphia, in the county of Philadelphia and State of Pennsylvania, have invented an Improvement in Mechanical Movements, of which the following is a specification.

My invention relates to that class of inventions known as "mechanical movements," but more particularly to a class of mechanism by which a shaft has a forward-and-backward motion imparted to it, in which the relative speeds may be the same or very much greater in one case than the other.

It consists of an arrangement of mechanism chiefly composed of gear-wheels, shafts, and a screw, which are so constructed that when the same are put in motion the main shaft moves in one direction until a certain point is reached, when a catch is thrown into action by an auxiliary shaft or bar, causing a change to take place in the motion of the shaft by a differential movement on the part of the gear-wheels and screw.

The object of my invention is to give to machines of various kinds, but more especially to drilling and boring machines, a mechanism to facilitate their action by causing them to work automatically, and, if desired, to give a slow movement to the cutting-tool while entering the metal, and a more rapid movement upon its return.

Figure 3:
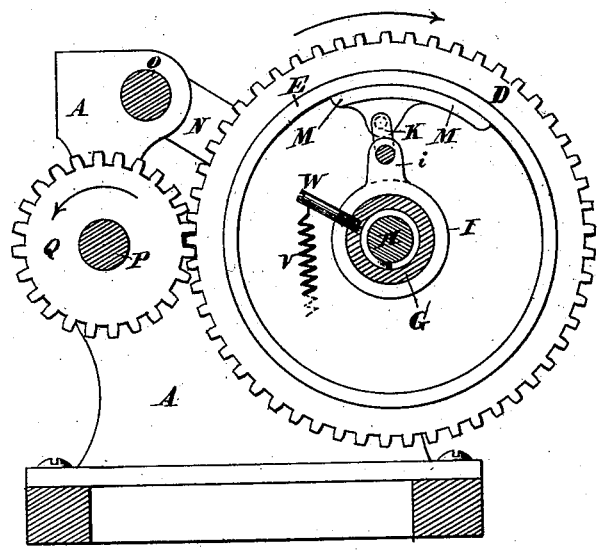
Figure 4:
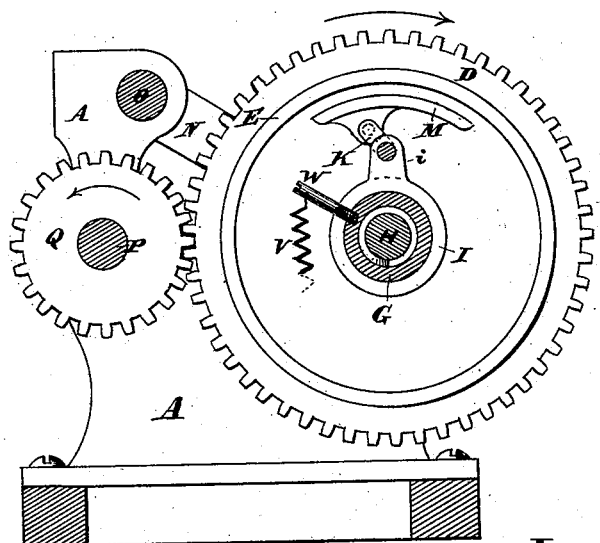

Referring to the accompanying drawings, Figure 1 is a sectional plan of the mechanism embodying my invention. Fig. 2 is a plan of same. Fig. 3 is a cross-section of same, showing friction-shoe in action. Fig. 4 is a cross-section of same, showing friction-shoe out of action.

A A A is the frame of the machine. B is the main shaft, which is supplied with a screw, H, and is free to move laterally in its bearings $b\ b'$ in frame A. C is a gear-wheel, which is secured to the shaft B and gears into the pinion R, which is secured to the driving-shaft P, which revolves in bearings $p^1\ p^2$ in frame A, and is kept from lateral movement by the collar $a$, which is secured to it by a set-screw or key. The shaft P is driven by a crank, S, or other means.

A nut, G, works upon the screw H on shaft B. Upon this nut G there are three pieces— viz., a gear-wheel, D, which is loose upon it; a collar, I, which is secured to it; and a clutch-wheel, F, which is loose upon it.

The gear-wheel D is of smaller diameter than wheel C, and is supplied with a circular projection, E, upon one of its sides, the use of which will be presently explained.

The clutch-wheel F has a slot, $f'$, in which the pin of the crank $k$ moves. This wheel is also supplied at its periphery with a series of teeth, $f$, of the shape shown in Fig. 2, and into which the lever T plays.

The lever T has a hook, $t$, at its extremity, has its fulcrum at $t'$, two bulges from its sides $t''\ t''$, and is pointed at $t'''$. Against this point $t'''$ the spring U, having the point $u$, rests, and keeps the point $t'''$ on one side or the other of the ∧-shaped point $u$. When it is to the right of $u$ the hook $t$ has caught the teeth $f$ in the wheel F; but when it is on the left of $u$ the hook $t$ is thrown out of the teeth $f$, leaving the wheel F free to revolve with the gearing. This lever T is moved by the collars $p^3\ p^4$ upon the auxiliary bar $o$ striking the projections $t''\ t''$ of the lever T.

The auxiliary bar O is connected to the main shaft B by the bar N, and does not revolve, but has a lateral motion of the same velocity as the shaft B.

Secured to the shaft P is a pinion, Q, of a larger diameter than R, and which gears with D. A collar, J, prevents any lateral motion of the nut G upon the screw H.

Within the annular space in D bounded by projection E is a friction-shoe, M, which is moved by a double crank, K $k$, having a bearing in projection $i$ of collar I.

When clutch-wheel F is free to move, the spring V, which is connected to the pin $f''$ in wheel F and set-screw W in collar I, tends to pull it around, which moves the crank $k$, whose pin is in slot $f'$, thereby causing a movement of the crank K, giving an outward movement to the friction-shoe M, which jams against the inner face of projection E. This action makes a single nut of the parts D, I, F, and G, which compound nut is then revolved by the pinion Q.

The shoe M is so arranged that the more we drive the wheel D in its normal direction, the tighter becomes the friction mechanism.

The moment the hook $t$ of lever T catches the teeth $f$, the cranks K $k$ are moved backward, and the shoe is thrown out of contact with the projecting ring M, causing the nut G to become stationary, while the wheel D revolves idly upon the said nut, but forms no part of the same.

The wheel F might be entirely thrown away and lever T allowed to catch the crank-pin of crank $k$.

Operation: The shaft P is caused to revolve by any suitable means, revolving pinions R and Q, which are secured upon it. The clutch-lever T $t$ is out of clutch-wheel F. The friction-shoe is tight against the ring-projection M. The gear-wheels C and D revolve, only, owing to the different diameters of the wheels, they move with different velocities. The friction-shoe being tight against M, the motion imparted to D is transmitted to G, causing this nut to revolve upon the screw H, and as it is prevented from moving horizontally upon the screw H it tends to impart to its shaft a motion in the direction of the arrow, Fig. 1, while at the same time the gear-wheel C causes the screw H to revolve with a less velocity than the nut G, and tends to move the shaft B in the direction contrary to that indicated by the arrow, Fig. 1; hence the shaft B moves in the first direction with a speed equal to the difference in velocities which the wheels C and D tend to move the shaft B. From this it is seen to be nothing more or less than a differential screw. This motion in the case of boring would be very slow.

The auxiliary bar O, moving with shaft B, throws the catch-lever T over by the collar $p^4$ until the hook $t$ catches the wheel F, which movement loosens the friction-clutch, and the nut G is left stationary while the screw revolves; hence the shaft moves in the direction contrary to the arrow with considerable speed until the collar $p^3$ throws out the catch-lever T, and the nut G is again put in motion and the shaft B returns. This back-and-forth motion is automatic.

Any length of movement can be imparted to the shaft B by setting the collars $p^3$ $p^4$ nearer or farther apart.

I claim—

1. The nut G and screw H, in combination with the differential gears D, C, Q, and R, substantially as described.

2. The nut G, in combination with the gear D, collar I, double crank K $k$, and friction-shoe M, substantially as and for the purpose described.

3. The nut G, in combination with the collar I, double crank K $k$, clutch-wheel F, catch-lever T, and spring V, substantially as described, and for the purpose specified.

4. The lever T and spring U, in combination with bar O, collars $p^3$ $p^4$, and shaft B, substantially as and for the purpose described.

5. The double crank K $k$, collar I, nut G, shoe M, and wheel D, in combination with the catch-lever T, substantially as and for the purpose specified.

6. The nut G, in combination with the collar I, double crank K $k$, wheel F, shoe M, and wheel D, substantially as and for the purpose specified.

In testimony of which invention I hereunto set my hand.

CHARLES TYSON.

Witnesses:
R. M. HUNTER,
O. D. McCLELLAN.